United States Patent Office 3,525,849
Patented Aug. 25, 1970

3,525,849
HEATING INSERTS
Richard Bleckmann, Imbergstrasse 24, Salzburg, Austria
Filed Dec. 19, 1968, Ser. No. 785,125
Claims priority, application Austria, Dec. 28, 1967,
11,716/67
Int. Cl. H05b *3/80*
U.S. Cl. 219—318          20 Claims

ABSTRACT OF THE DISCLOSURE

An improved electric appliance with a liquid tank, e.g., a washing machine, wherein the liquid can be heated by an electric heating insert. The heating insert has a sealing member of an elastic material, fitted over the legs of a tubular heating element, which may be U-shaped. Within the sealing element, there is a blind recess, containing plate-shaped parts arranged on both sides of the legs of the heating element and adapted to be spread apart so that the sealing element is pressed against the surrounding walls of the opening of the tank.

---

There are known heating inserts in which the fixing device consists of two metal components, such as a flange and a support, of which one is within the liquid tank and the other outside the same. A rubber seal is arranged between these two parts, which may be connected, for example, by means of a screw, enabling the rubber seal to be compressed for sealing the opening in the tank wall, and possibly also for sealing the ends of the heating element passing therethrough. However, it is very difficult to effect an effective seal for the screw connecting the two metal members. Frequently, the rubber seals must be exposed to substantial pressures to ensure an adequate seal. After prolonged use, for example, lasting several years, there is a danger of the rubber seal ageing and not returning to its original shape when released, and this may lead to difficulties, when changing a damaged or burnt-out heating insert.

In order to eliminate these drawbacks, there have already been proposed constructions, in which the support element has been omitted.

It is the object of the invention to provide an improved heating insert, in which the contact pressure acting on the sealing element and required for sealing the tank wall opening, is provided by plate-shaped parts arranged in a recess of the sealing element.

The invention will be further described, by way of example, and further advantages and features will become apparent from the following description with reference to the accompanying drawings, and from the appended claims.

Figure 1:
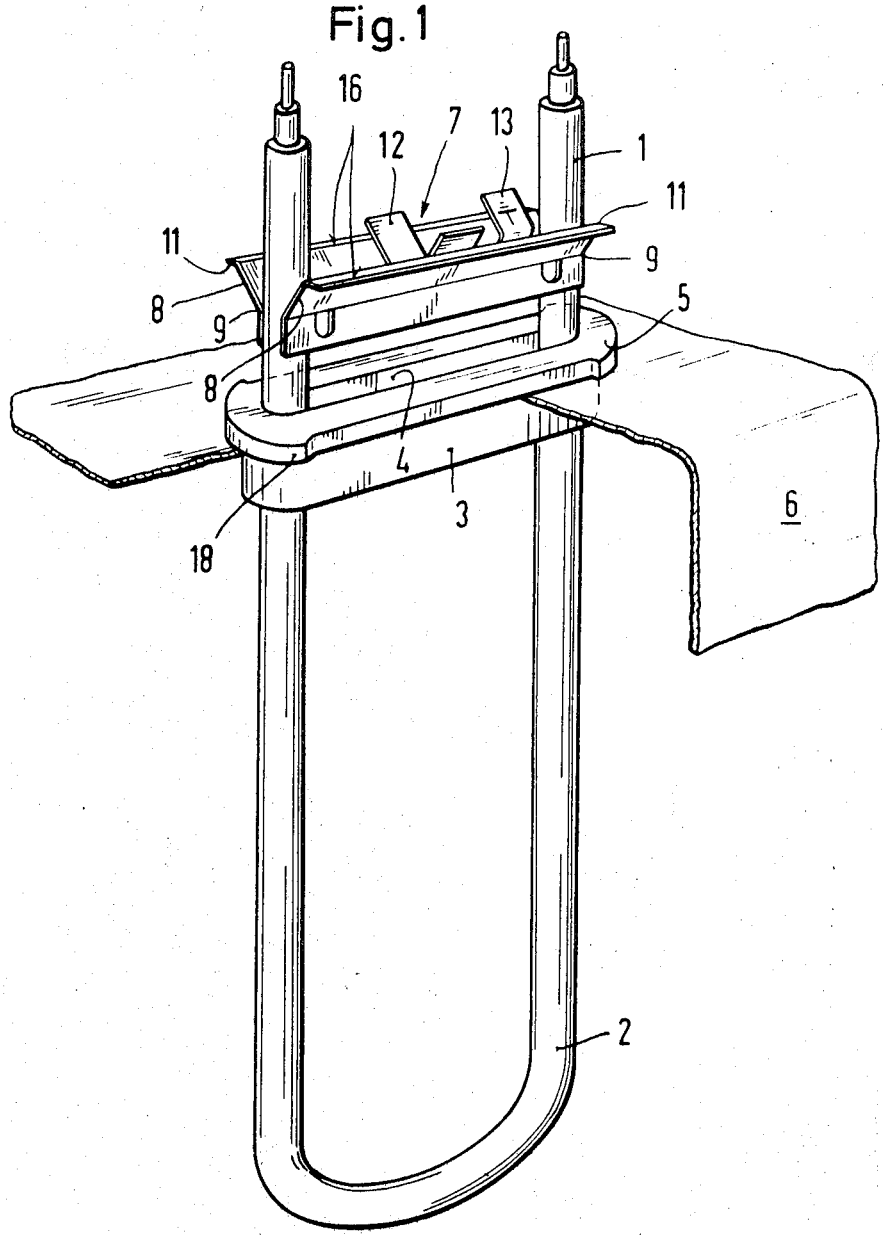
FIG. 1 shows a perspective view of a heating insert adapted to be fitted into an oblong hole in a tank wall, with the fixing device pulled out.

The legs 1 of a tubular heating element 2, equipped with the connecting terminals for connecting the electric power supply, pass through a sealing element 3 of elastomeric material, which has a recess 4, in the shape of a blind bore and a flange 5. As shown in FIGS. 1 to 6, a tank has a wall opening into which the sealing element 3 is fitted. The tank wall opening has the shape of an oblong hole, that is to say, its length is at least twice as long as its width. The recess 4 extends to beyond the thickness of the container wall, but is closed against the interior of the tank. The fixing device 7 is mounted in this recess 4. For the sake of clarity of the drawing, FIG. 1 shows the fixing device outside the recess 4. The fixing device consists of two plate-shaped parts 8, angled twice about edges 9 and 11. The said plate-shaped parts 8 are interconnected by a strip 12, forming a plastically, i.e., non-elastically deformable connecting link. The arrangement is such that the entire fixing device is seated firmly on the legs 1 of the tubular heating element 2, that is to say, that a good contact is ensured irrespective of the elastic tension of the sealing element 3. In consequence, an earth terminal 13 may be provided directly on one of the plate-shaped parts 8. This represents a substantial advantage, since damage to the surface of the tubular heating element 2 may thereby be prevented, such as may occur, for example, if an earth terminal is soldered to the jacket of the tubular heating element 2. The plate-shaped parts 8 are provided with punched lugs 14, shown more particularly in FIG. 6. During the assembly, the strip 12 is pressed together by a pair of automatic pliers, causing the plate-shaped parts 8 to pivot about their edges 9 at the legs 1 of the tubular heating elements 2. At the same time, the lugs 14 force the legs 1 of the tubular heating elements 2 apart so that the rounded narrow faces of the sealing element 3 are pushed into the rounded portions of the oblong hole. Thus, the fixing device illustrated produces two mutually perpendicular pressure components in the sealing element 3, and this ensures a good seal in the opening of the tank wall.

The edge 11 also forms a base plate 16 for the type designation of the tubular heating element 2.

Figure 3:
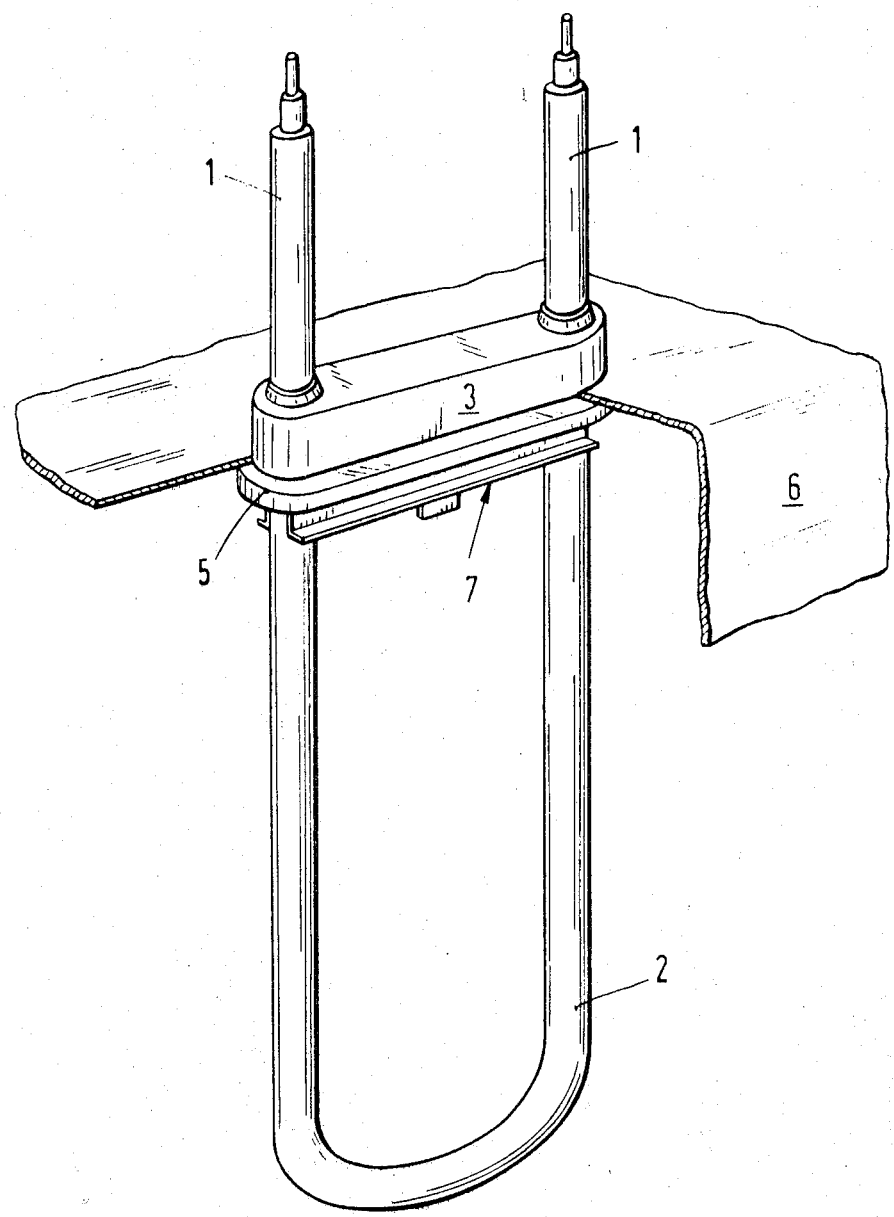
FIG. 3 shows the heating insert of FIGS. 1 and 2 for internal assembly.
Figure 4:
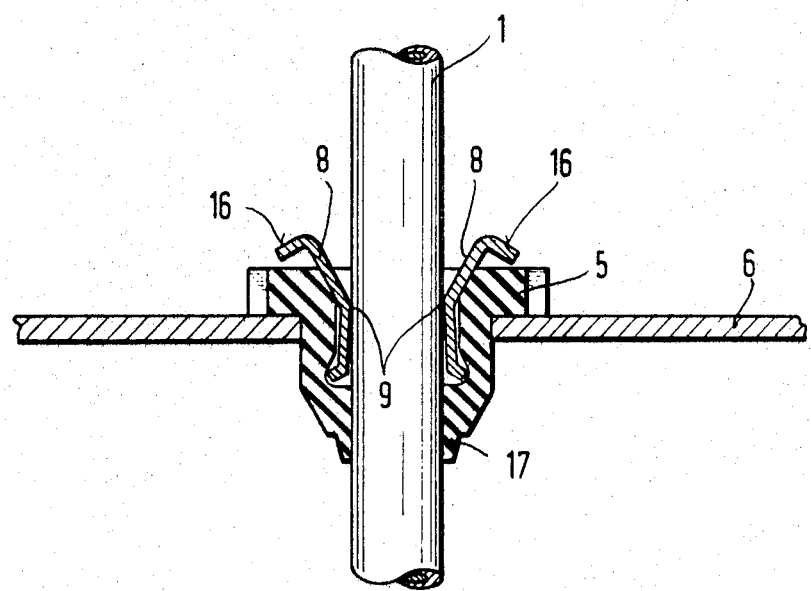
FIG. 4 is a cross-section along the line IV—IV in FIG. 2, prior to the tightening of the fixing device, on an enlarged scale.
Figure 5:
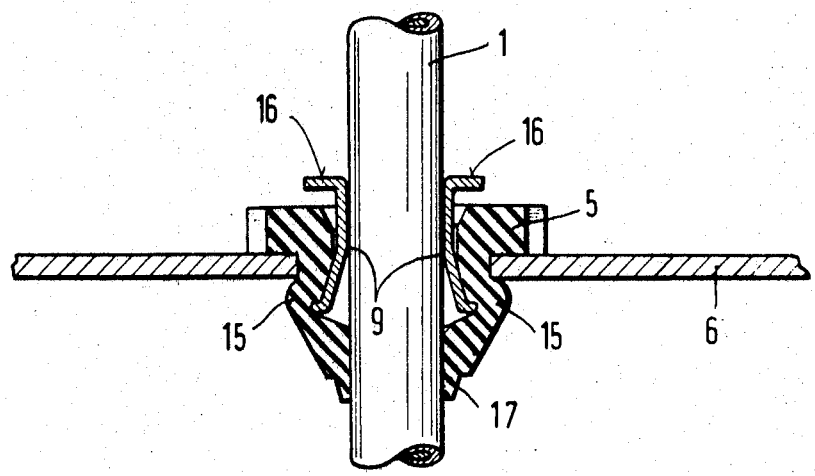
FIG. 5 is a cross-section corresponding to FIG. 4, after the tightening of the fixing device.

FIG. 3 shows that the heating insert can also be used for internal assemblies, for example, in dish-washing machines. For this application, the sealing element 3 is reversed, i.e., its recess 4 points towards the interior of the tank. In this case, the fixing device 7 must be made of a material which is resistant to corrosive influences.

To ensure a good seal of the legs 1 of the tubular heating element, the sealing element 3 may have lugs 17. The holes in the sealing element 3 and the inner diameter of the lugs 17 are substantially smaller than the diameter of the legs 1 of the tubular heating elements 2 so that the tubular heating element 2 is seated firmly in the sealing element 3.

Figure 6:
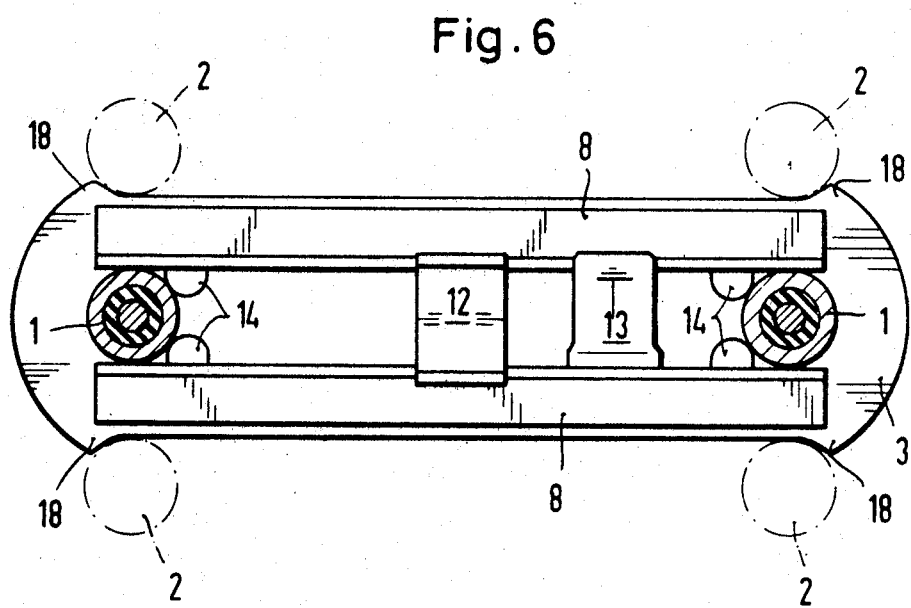
FIG. 6 is a plan view of the heating insert on an enlarged scale.

FIG. 6 also shows that the flange 5 is provided with lugs or projections 18. All metal components, including therein the fixing device, are located within the profile of the flange 5 of the sealing element 3, and the heating inserts can therefore be stacked one on top of the other in that manner that the sealing elements 3 serve as spacing members. The lugs 18 hold the tubular heating elements 2 of the adjacent heating insert. This results in substantial savings on packing materials for transport.

Figure 7:
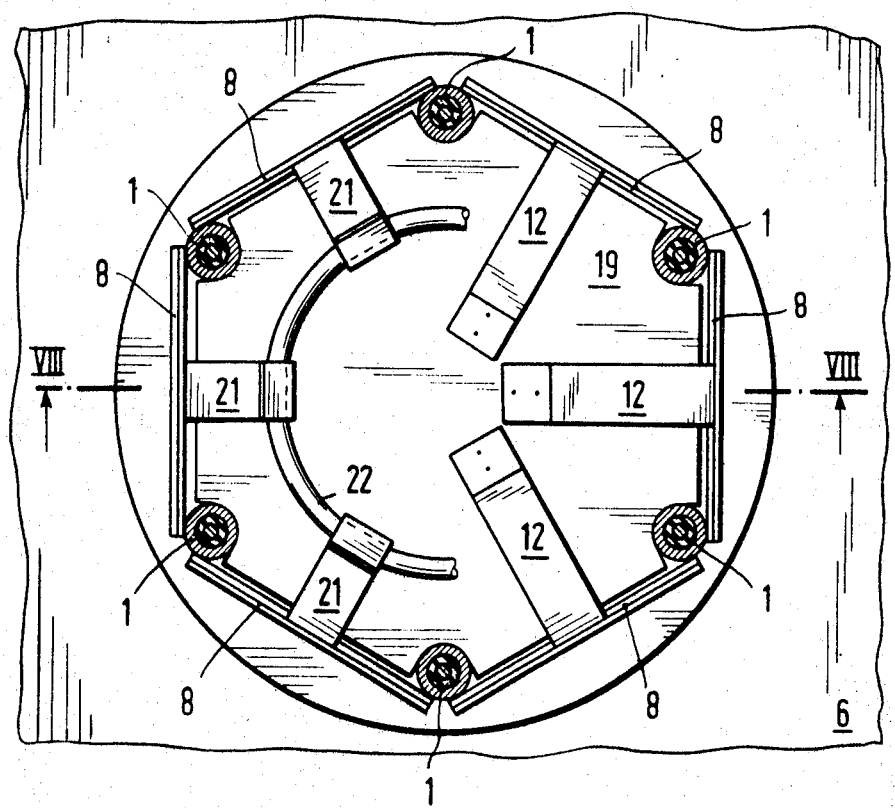
FIG. 7 is a plan view of a heating insert for a circular hole in a tank wall, the left side showing a first embodiment and the right side a second embodiment of the fixing device.
Figure 8:
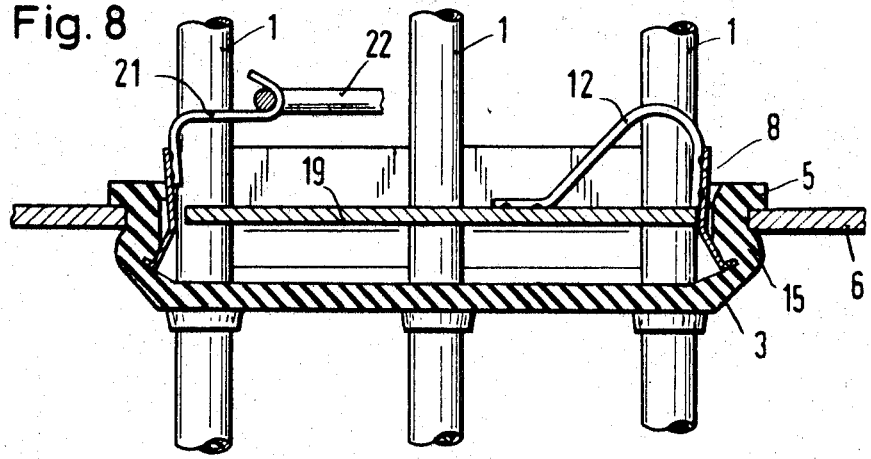
FIG. 8 is a cross-section along the line VIII—VIII in FIG. 7.

In the embodiment shown in FIG. 7, the legs 1 of three U-shaped tubular heating elements 2 are held in position by means of a distance plate 19. Strips 12, carrying the plate-shaped parts 8, are welded to the distance plate 19. When these strips 12 are bent by means of a special pair of pliers, the plate-shaped parts 8 located with the recess 4 of the sealing element 3 are pivoted outwardly and cause the circular hole in the tank 6 to be sealed. The left half of FIGS. 7 and 8 shows that the strip 12 can also be replaced by hooked elements 21 which are retained by a locking ring 22.

The locking ring 22 is inserted after all hooked elements 21 have been pulled towards the inside by means of a special plier-shaped tool.

Figure 9:
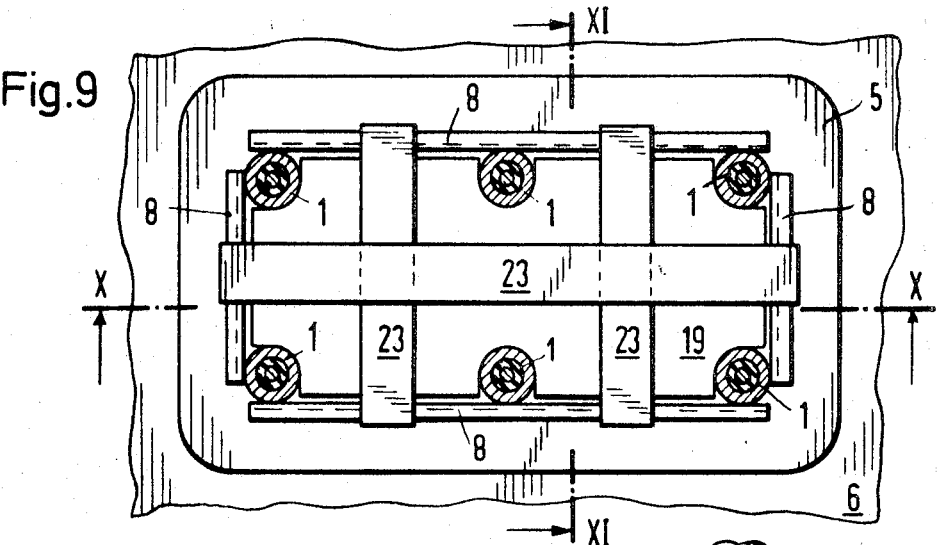
FIG. 9 is a plan view of a heating insert for a rectangular opening in a tank wall.
Figure 10:
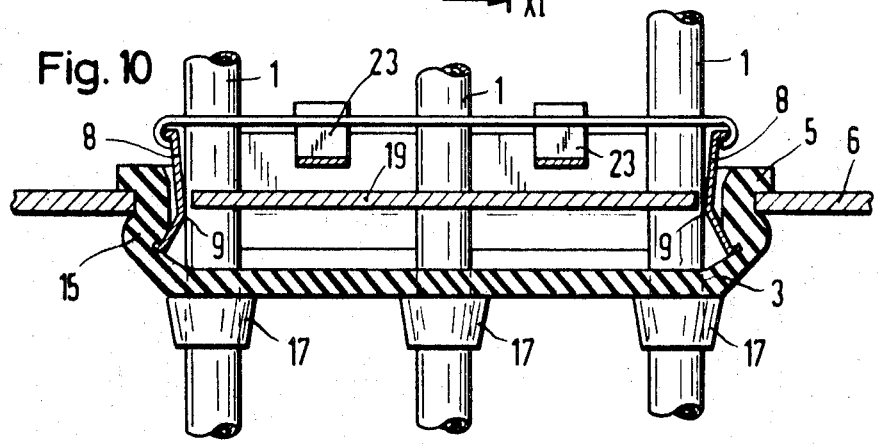
FIG. 10 is a cross-section along the line X—X in FIG. 9.
Figure 11:
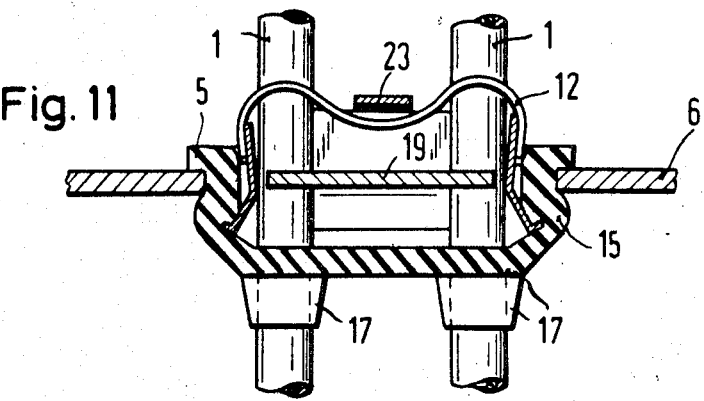
FIG. 11 is a cross-section along the line XI—XI in FIG. 9.

FIGS. 9 to 11 show an embodiment with a rectangular opening in the tank wall. In this construction, two pairs of plate-shaped parts 8 are arranged parallel to the sides of the rectangle. The longer plate-shaped parts 8 bridge three legs 1 of tubular heating elements and rest thereon by means of their edges 9. The plate-shaped parts 8 are held in the outwardly pivoted position by clips 23. As illustrated in FIG. 11, the clip 23 may, however, also be replaced by a deformable strip 12.

In order to economize in materials, the recess 4 in the sealing element is as large as possible, resulting in a dished or pot-shaped configuration of this element. The bottom of the sealing element 3 is always located at a certain distance from the wall of the tank 6 so that the side walls of the sealing element 3 can be pressed in the form of beads against the rear wall of the tank.

Figure 12:
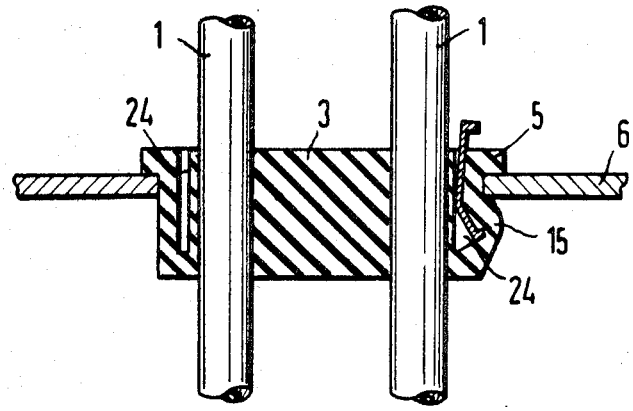
FIG. 12 shows a cross-section of an embodiment, in which the sealing element is a solid body.
Figure 13:
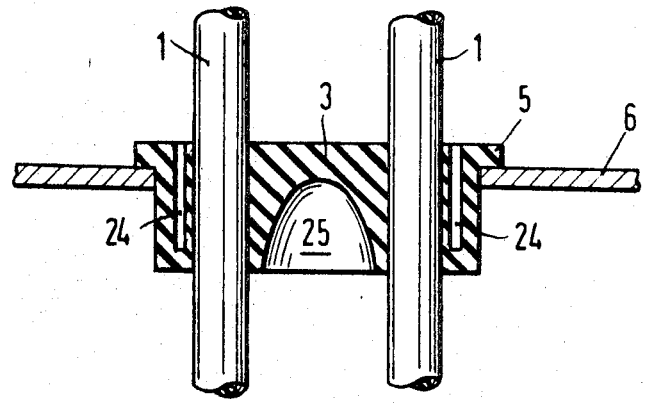
FIG. 13 is a cross-section of a modification of the embodiment of FIG. 12.

As indicated in FIGS. 12 and 13, the sealing element 3 may also be a solid body. In this case, there are provided blind slots 24, adapted to receive the plate-shaped parts 8. FIG. 12 illustrates that some elastomer material may be located between the plate-shaped parts 8 and the legs 1 of the tubular heating elements 2, especially where a particularly good seal of the element 2 is required.

For further economy, the sealing element 3 may have a dished cavity 25 on both sides, as indicated in FIG. 13.

Figure 14:
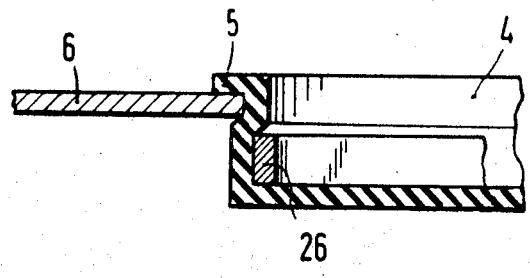
FIG. 14 is a cross-section of an embodiment in which the fixing device is constructed after the manner of a tubular circlip.

FIG. 14 shows that the fixing device 7 may also consist of a circlip 26 which is fitted into the recess 4 of the sealing element.

Figure 2:
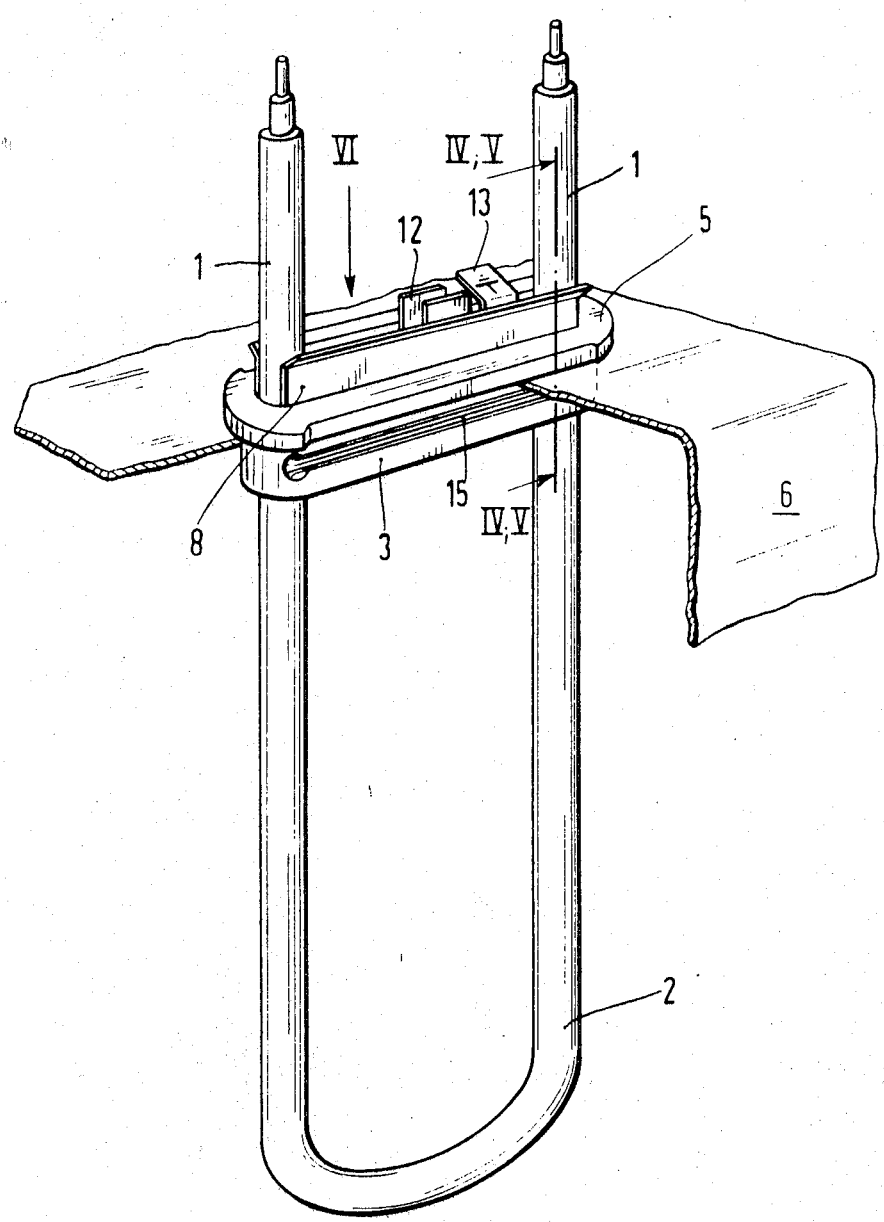
FIG. 2 shows the heating insert of FIG. 1 after the fixing device has been tightened.
Figure 15:
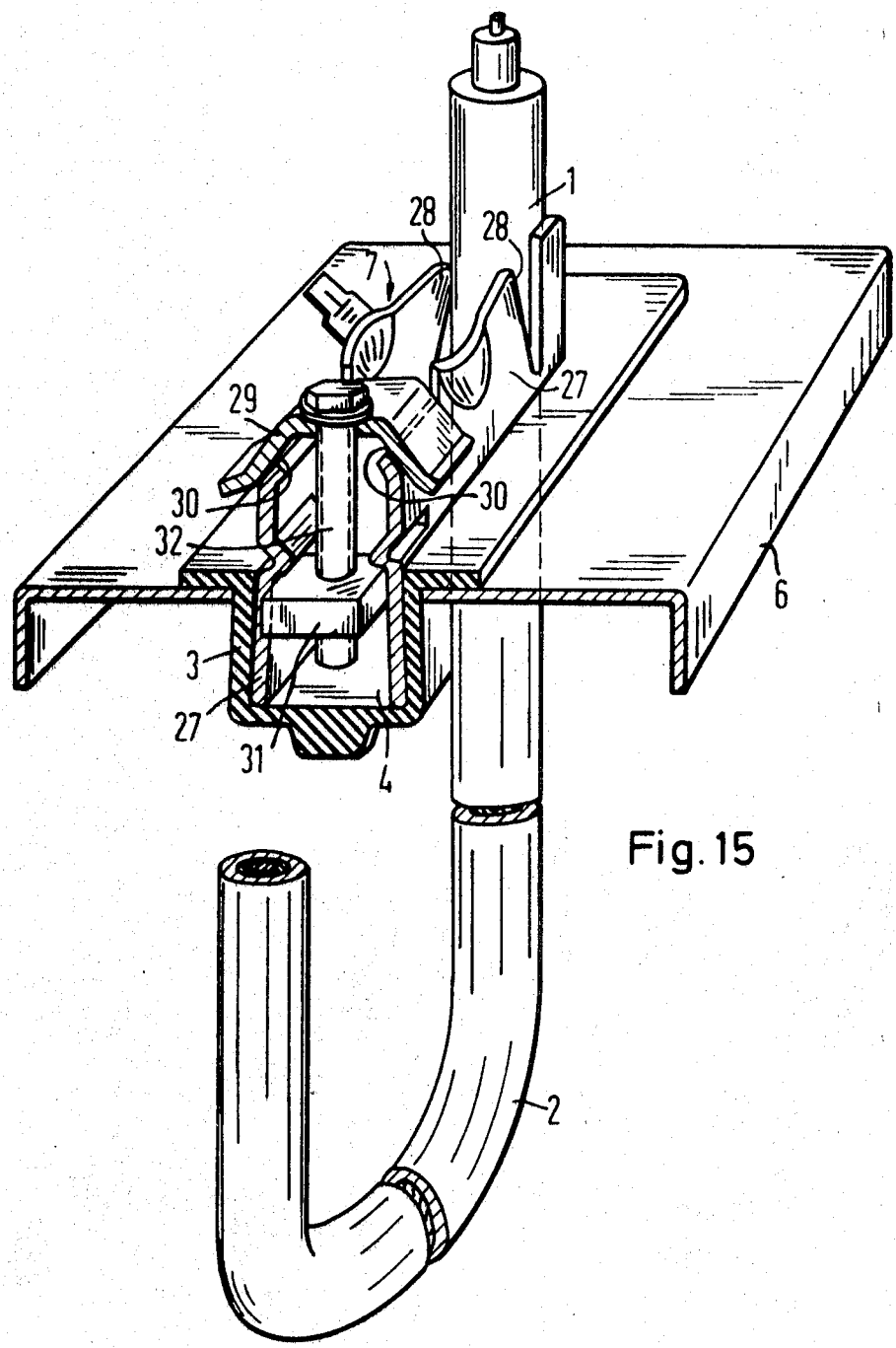
FIG. 15 is a partly cross-sectional view of yet another embodiment of the invention, similar to that illustrated in FIGS. 1 to 3, wherein the fixing device is located by means of a screw.

FIG. 15 shows an embodiment, in which—similarly to the construction illustrated in FIGS. 1 to 3, a fixing device 7 is fitted into the recess 4 of the sealing element 3. This fixing device consists substantially of two plate-shaped parts 27. The plate-shaped parts 27 are recessed and slightly bent at their edges 28 so that the latter rest on the jackets of the tubular heating elements 2. Between the legs of the tubular heating elements 2, these plate-shaped parts 27 are arranged to face each other. They are held together by clips 29 with two wedge faces 30. A nut 31 is arranged between the two plate-shaped parts 27 and is prevented from rotating by these parts. A screw is adapted to be screwed into the nut 31 and passes through the clip 29. When the screw 32 is tightened, the plate-shaped parts 27 are caused to swivel and press the sealing element 3 against the rear wall of the tank 6. Simultaneously, the mutual approach of the edges 28 causes the legs 1 of the tubular heating element to be spread apart and the outer part of the jacket presses the sealing element into the associated narrow side of the opening of the tank wall, producing an effective sealing effect.

The heating inserts are supplied with fixing devices 7 fitted into the recess 4 of the sealing element 3. Particularly with compressed air operated special tools, the assembly period may then be reduced to a few seconds. If the heating insert must be replaced by the service department, the ends of the strip 12 are bent apart, or the circlips 22 or the clips 23 are removed. Then the whole fixing device 7 may be withdrawn from the sealing element 3. This ensures that the heating insert may be detached reliably even if the rubber of the sealing element 3 has hardened. In addition, further holes or bores may be provided in the sealing element, for example in order to introduce temperature controls into the interior of the tank. Since the plate-shaped parts 8 rest both on the legs of the tubular heating elements, and in the immediate vicinity of the tank rear wall, the heating insert is fixed in the tank opening without positional changes. Retightening is possible at any time when the elasticity of the rubber of the sealing element drops and the seal becomes less effective.

Figure 16:
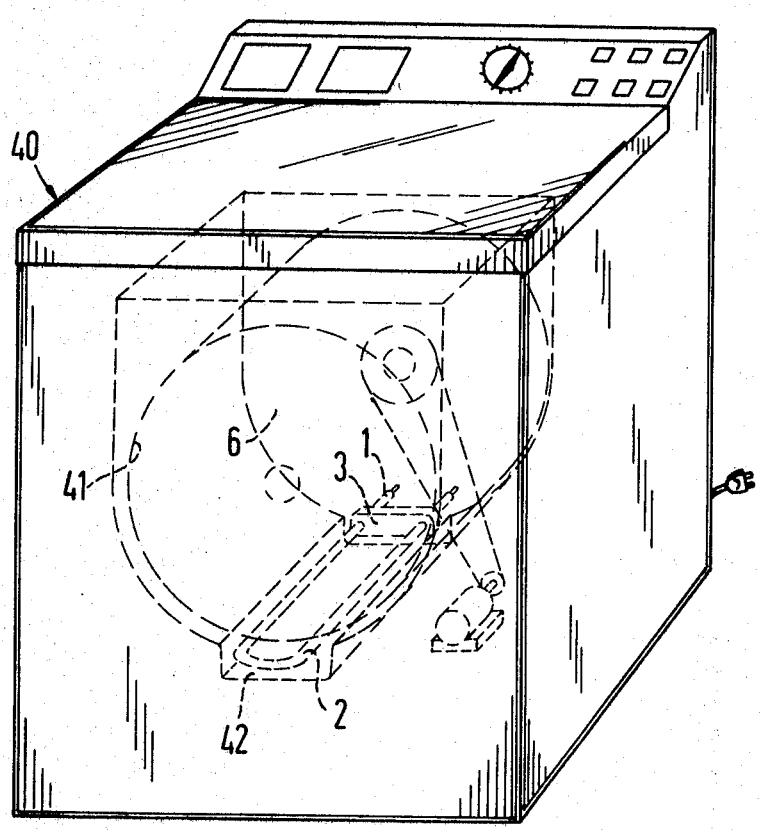
FIG. 16 illustrates the installation of a heating insert into a washing machine, viewed in perspective.

FIG. 16 shows an example of the installation of a heating insert according to the invention into a washing machine 40.

The washing drum 41 is located in the tank 6 which has a recess 42 in its base. The heating element is so mounted on the rear side of the tank 6 that it extends into the recess 42.

I claim:

1. In a heating device in an electric appliance having: a liquid container, an opening in a wall of the liquid container, a resilient sealing element seated in the opening of the container wall and substantially filling it, at least one electric heating element having at least two legs spaced apart from each other, opening in the sealing element through which the legs of the heating element extend, the sealing element having at least one recess in which a blind hole is defined by side walls and a bottom which extends substantially parallel to the opening in the container wall, at least one fastening device which is inserted in the blind hole recess and has first sealing means which sealingly press exposed walls of the sealing element against first opposed edges of the opening in the container wall; the improvement comprising: second sealing means which lie at least partially between the legs of the heating element and spread same apart in a direction against second opposed edges of the opening in the container wall to create an effective seal between the sealing element and the edges of the opening in the container wall.

2. Device according to claim 1, in which the fastening device consists of two bent plate-shaped parts which can be inserted parallel to opposed walls of the blind hole recess of the sealing element, the bent edges of which extend substantially parallel to two opposed sides of the opening in the container wall, are directed against each other and rest against the legs of the heating element, and the said plate-shaped parts can be pivoted around the bent edge.

3. Device according to claim 2, in which the bent edges lie substantially in the plane of the opening in the container wall.

4. Device according to claim 2, in which the second sealing means are projections on the plate-shaped parts which are directed towards each other and which bear against the oppositely directed surfaces of the legs of the heating element and spread same apart in direction normal to opposed sides of the opening in the container wall.

5. Device according to claim 2, in which the plate-shaped parts are fixed in clamping position by a non-elastic deformable fastening member.

6. Device according to claim 2, in which the plate-shaped parts are fixed in clamping position by a member which engages over the edges thereof lying toward the outside of the sealing element and is fastened by a screw which can be screwed into a nut lying between the plate-shaped parts.

7. Device according to claim 1, in which the fastening device comprises a spring ring which is insertable in the blind hole recess in order to press the side walls of the sealing element against the edges of the opening in the container wall.

8. Device according to claim 2, in which a grounding contact is arranged on one of the plate-shaped parts.

9. Device according to claim 2, in which the sealing element has on its bottom surface extensions which resiliently surround the legs of the heating element.

10. Device according to claim 2, in which the connecting ends of the heating element are arranged on the side of the sealing element lying outside the container and the fastening device is arranged within the container, the fastening device consisting of corrosion-resistant material, such as stainless steel.

11. Device according to claim 1, in which the sealing element has a flange the circumference of which is larger than the opening in the container wall and which rests against the container wall.

12. Device according to claim 1, in which the heating element is bent in hairpin shape.

13. An electric appliance as set forth in claim 2, wherein the heating element is tubular.

14. An electric appliance as set forth in claim 13, wherein the plate-shaped parts are angled and the edge thus formed rests on the legs of a tubular heating element and forms the pivot axis.

15. An electric appliance as set forth in claim 14, wherein the edges of the plate-shaped parts resting on the tubular heating element are so formed that the legs of tubular heating element are spread apart in the direction parallel to the pivot axis when the plate-shaped parts are pivoted.

16. An electric appliance as set forth in claim 2, wherein the plate-shaped parts have second sealing means as lugs acting as cams on the legs of the heating element to spread the same.

17. An electric appliance as set forth in claim 1, wherein the container wall opening is an oblong hole having a length at least twice its width and wherein the legs of the tubular heating element are arranged in the long axis in spaced apart relationship between two plate-shaped parts extending parallel to the long center axis of the container wall opening.

18. An electric appliance as set forth in claim 1, wherein the container wall opening is a polygon and several fastening devices are provided and equidistantly distributed over the periphery of the container wall opening.

19. An electric appliance as set forth in claim 2, wherein the fastening device contains an elongated tensioning member which retains the plate-shaped parts in their outwardly pivoted position.

20. An electric appliance as set forth in claim 1, wherein an earth terminal is mounted on one of the fastening devices.

References Cited

Bleckmann et al.: German printed application, 1,208,959, January 1966.

JOSEPH V. TRUHE, Primary Examiner

C. L. ALBRITTON, Assistant Examiner

U.S. Cl. X.R.

219—315, 336, 523, 536